United States Patent [19]

Jacobs et al.

[11] 4,114,709
[45] Sep. 19, 1978

[54] ELECTRONIC SCALE LOAD CELL PROTECTOR

[75] Inventors: Maxwell E. Jacobs, Brooklyn; Eric R. Aaldenberg, Bayside, both of N.Y.

[73] Assignee: Detecto Scales, Inc., Brooklyn, N.Y.

[21] Appl. No.: 776,314

[22] Filed: Mar. 10, 1977

[51] Int. Cl.² ........................................... G01G 23/02
[52] U.S. Cl. ................................. 177/156; 177/159
[58] Field of Search ............... 177/154, 156, 187, 230, 177/255

[56] References Cited

U.S. PATENT DOCUMENTS

| | | | |
|---|---|---|---|
| 973,909 | 10/1910 | Benson | 177/156 |
| 1,654,648 | 1/1928 | Hem | 177/187 |
| 2,648,534 | 8/1953 | Mettler et al. | 177/154 X |
| 3,561,553 | 2/1971 | Blubaugh | 177/255 X |
| 4,058,179 | 11/1977 | Price | 177/156 |

*Primary Examiner*—George H. Miller, Jr.
*Attorney, Agent, or Firm*—Kane, Dalsimer, Kane, Sullivan and Kurucz

[57] ABSTRACT

An electronic scale is provided having a frame to which a load cell is secured. The scale further includes a weight receiving means, a first transmission linkage affixed to the cell and a second weight transmission linkage affixed to the weight receiving means. A preloaded coil spring extends between the linkages. The coil spring is preloaded by a force slightly less than the maximum force to which the load cell can safely be subjected so that when subjected to a force, no change in the overall length of the spring occurs until the preloaded force is exceeded. A stop member is affixed to one of the linkages to engage portions of the frame which extend in the path of movement of that linkage when the spring extends.

5 Claims, 2 Drawing Figures

ELECTRONIC SCALE LOAD CELL PROTECTOR

BACKGROUND OF THE INVENTION

The present invention relates to electronic weighing devices and more particularly to a device for protecting the load cell of such electronic weighing devices.

Electronic scales are rapidly growing in pupularity for home, medical and industrial applications. Such scales utilize a load cell to convert an applied weight to a voltage level used to drive a readout device such as a numeric display. The load cell may, for example, comprise a piezoelectric crystal device which produces a voltage proportional to the stress applied to it by the weight. Such devices are extremely sinsitive and accurate.

A problem encountered with such scales is that the load cell is highly volnerable to being damaged and/or destroyed as a result of shock loads applied to it since such loads can far exceed the rated value of the load cell. The problem is complicated by the fact that for the overall scale range the total deflection of the load cell may be measured in thousandths of an inch. For example, the load cell of a physician's scale having a maximum capacity on the order of 300 lbs. is approximately 0.003 inch. This makes it extremely difficult if not impossible to provide mechanical stop means to protect the cell from being subjected to loads far in excess of its rated maximum value.

In view of the above, it is the principal object of the present invention to provide an improved electronic scale in which the load cell is protected from excessive loading or shock loading. A further object is to provide such protection without interfering with the weighing capability of the scale. A still further object is to provide such protection in a manner which is relatively inexpensive and may readily be incorporated into existing scale designs without requiring any drastic modifications.

SUMMARY OF THE INVENTION

The above and other beneficial objects and advantages are attained in accordance with the present invention by providing an electronic weighing device having a frame to which a load cell is secured. The scale further includes a weight receiving means, a first transmission linkage affixed to the cell and a second weight transmission linkage affixed to the weight receiving means. A preloaded coil spring extends between the linkages. The coil spring is preloaded by a force slightly less than the maximum force to which the load cell can safely be subjected so that when subjected to a force, no change in the overall length of the spring occurs until the preloaded force is exceeded. A stop member is affixed to one of the linkages to engage portions of the frame which extend in the path of movement of that linkage when the spring extends.

DETAILED DESCRIPTION OF THE PREFERRED EMBODIMENT

Figure 1:
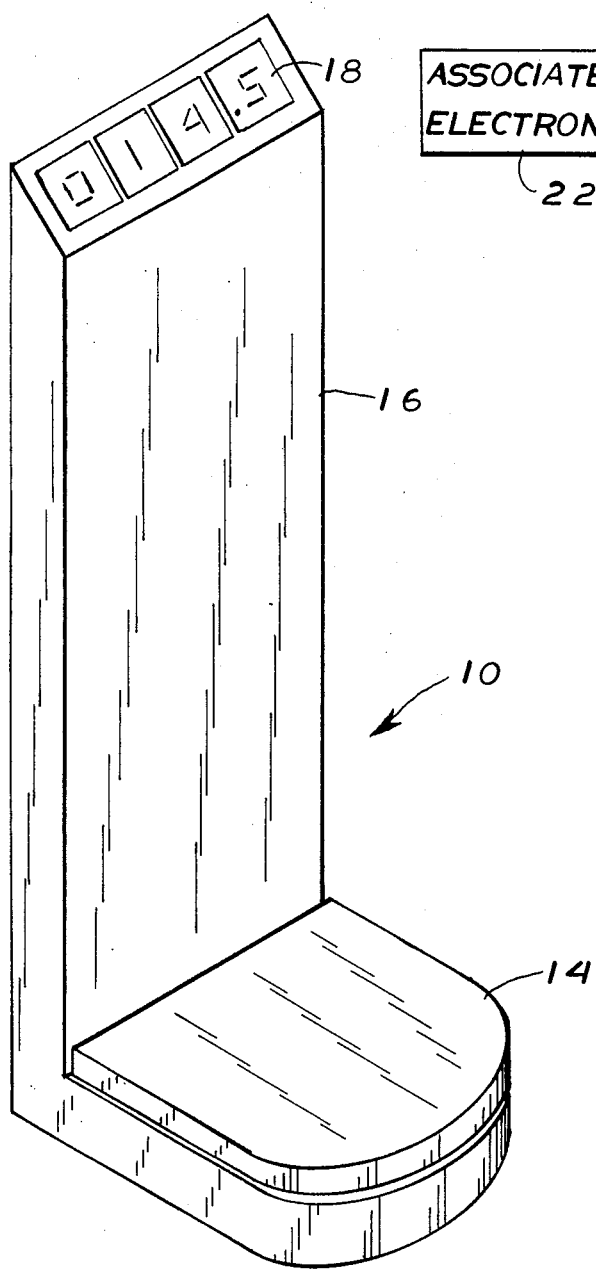
FIG. 1 is a perspective view of an electronic scale in accordance with the present invention; and, FIG. 2 is a simplified, diagrammatic view of the load cell detection feature of the scale of FIG. 1.

Reference is now made to the drawings and to FIG. 1 in particular wherein an electronic scale 10 is depicted. The scale comprises a frame 12 which includes a base containing a platform 14. The frame further includes an upwardly extending column 16 which carries a digital display 18 at its top end. The display 18 may comprise LEDs, Nixie tubes, or other similar devices. The display shown is capable of generating three digit numbers to a single decimal point. In practice, a physician's scale such as that shown generally has a maximum capability on the order of 300 lbs.

The electronics for the scale are well defined in the art and play no part in the present invention. Suffice it to say, the scale includes a load cell 20 which is suitably connected to the associated electronics 22 which, in turn, drive the display 18. The load cell comprises a transducer designed to receive the load applied on platform 14 and convert that to an electronic signal which is subsequently processed by the associated electronics 22 to the necessary form to drive the display 18. This relationship is depicted schematically in FIG. 2.

Figure 2:
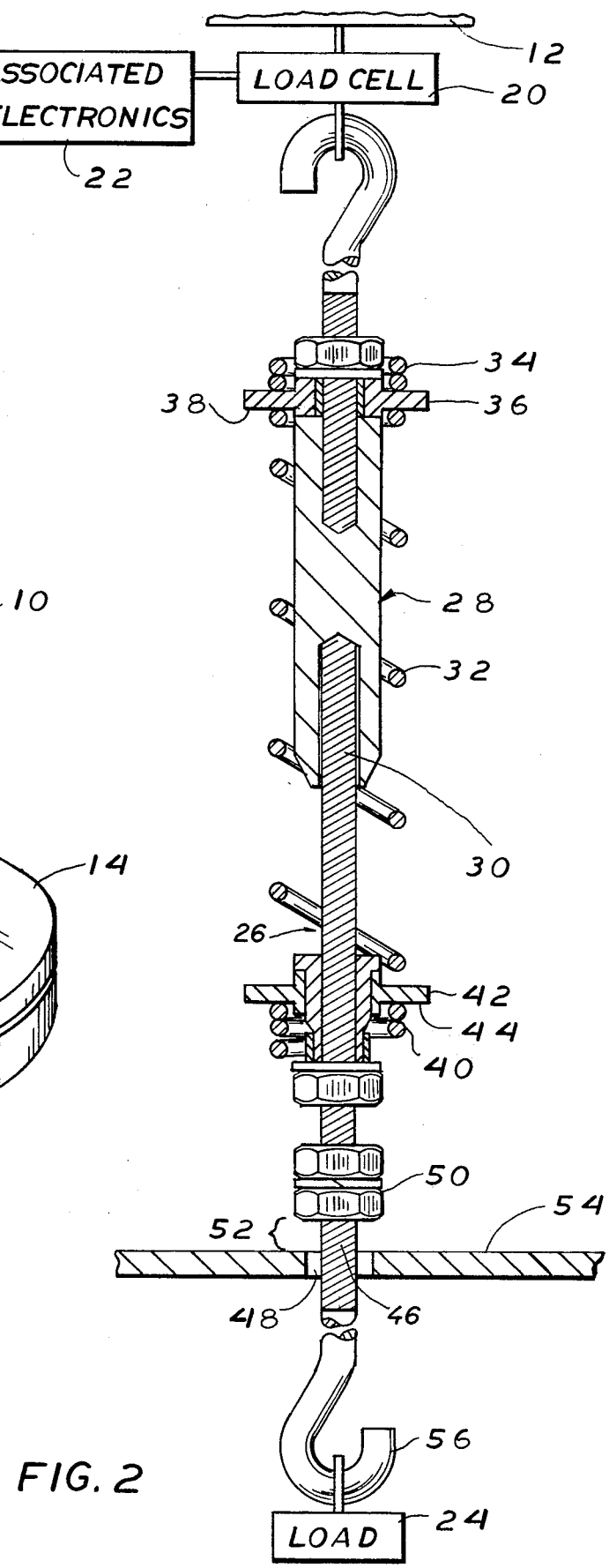

Referring to FIG. 2, it can be seen that the weight or load 24 is applied to load cell 20 through a pair of force transmission linkages 26 and 28. The load cell is suspended from a scale frame 12 so that the entire load 24 is applied to it. As can be seen, both linkages 26 and 28 comprise enlongated rods. Linkage 28 includes a bored-out bottom portion into which the top end 30 of linkage 26 is positioned for free sliding movement. The linkages 26 and 28 are secured to each other by a coil spring 32 which has its top end 34 secured to the flange 36 of an adjustable cap 38. Similarly, the bottom end 40 of the spring is secured by a flange 42 of cap 44 adjustably mounted to linkage 26. As shown, spring 32 is prestressed in tension by virtue of the longitudinal distance between caps 30 and 44. In this connection, it should be noted that the linkages 26 and 28 are axially aligned with each other and the coil spring extends about the linkages between the caps. The amount of prestressing in the spring depends on the distance between caps 38 and 44. Thus, by bringing the caps toward one another the prestressing of the springs may be reduced and conversely, by moving the caps further apart from one another the prestressing may be increased.

The lower portion of linkage 26 includes a section 46 which passes through an opening 48 defined in a plate 54 affixed to the frame. A stop 50 in the form of a nut is threaddedly secured to portions of linkage 26 above section 46. The gap (generally designated by numeral 52 between the bottom of stop 50 near the top of the flange defining opening 48 defines the maximum extension of the linkages 26 and 28 before the stop 50 will bottom and prevent further transmission of the load 24 to load cell 20 in the manner to be described forthwith.

In its assembled form, caps 38 and 44 are so positioned that the prestressing on spring 32 is slightly less than the maximum force to which the load cell can be subjected. When any weight less than the prestressing force of the spring is applied to member 26, members 26 and 28 will move together — because of the prestressing of spring 32 — to apply the load 24 to load cell 20. If the applied load 24 exceeds the prestressing on spring 32, the load will tend to stretch spring 32 thereby resulting in stop nut 50 bottoming on the surfaces of the plate 54 surrounding opening 48 and thereby prevent the applied load from being transmitted to the load cell. That is, the applied load will be carries by the spring 12 through the plate 54 and nut 50 rather than the load being applied to the load cell. Thus, by tuning the prestressing of spring 32 to the maximum load which the load cell 20 is capable of handling, the load cell can be protected from loads exeedint the prestressing force on the spring. The degree of protection of the load cell can be finely tuned by adjusting gap 52 by appropriately moving nut 50 closer or further away from plate 54.

In actuality, the mechanism depicted in FIG. 2 is contained within column 16 of FIG. 1. A suitable cantilever (not shown) connects platform 14 with the hooked end 56 of linkage 26 so that the weight of a person standing on platform 14 is transmitted to linkage 26 to become the load 24.

It should be appreciated that while the preferred embodiment of the invention was shown utilizing a spring 32 prestressed by tensioning, the invention would work just as satisfactorily if a prestressed compression spring were utilized. In that case, the spring would compress when a load exceeding the prestress force were applied.

Thus, in accordance with the present invention the aforemetnioned objects are effectively attained.

Having thus described the invention, what is claimed is:

1. An electronic weighing device comprising: a frame; a load cell secured to said frame; weight receiving means; a first weight transmission linkage affixed to said cell; a second weight transmission linkage affixed to said weight receiving means; a preloaded coil spring extending between and connecting said linkages and adapted to move integrally therewith, said spring being preloaded by a force slightly less than the maximum force to which said load cell can safely be subjected; and a stop member affixed to one of said linkages to engage portions of the frame if said spring preload force is exeeded, said frame portions being in the path of movement of said one linkage when a weight is applied to said receiving means.

2. The invention in accordance with claim 1 wherein said first linkage and second linkage are axially aligned, said spring comprises a tensioned coil spring disposed about said linkages and connected at one end to said first linkage and at the other end to said second linkage.

3. The invention in accordance with claim 2 further comprising spring receiving means affixed to at least one of said linkages and adapted to receive the end of said spring associated with said linkage, said spring receiving means being movable axially along said linkage whereby to permit adjustment of the preload on said spring.

4. The invention in accordance with claim 2 wherein said frame portions comprise surfaces of said frame defining an opening through which said one linkage passes and said top means comprises an enlarged flange mounted to said one linkage.

5. The invention in accordance with claim 4 wherein said stop means is mounted to said one linkage for axial movement thereon whereby to permit adjustment of the amount of movement of said one linkage prior to said stop means engaging said frame portions.

* * * * *